United States Patent
Gao et al.

(10) Patent No.: US 10,284,461 B2
(45) Date of Patent: May 7, 2019

(54) METHOD AND RELATED APPARATUS FOR PROBING PACKET FORWARDING PATH

(71) Applicant: Huawei Technologies Co., Ltd., Shenzhen (CN)

(72) Inventors: Mancang Gao, Nanjing (CN); Jiuyong Li, Nanjing (CN); Xingang Zhang, Nanjing (CN); Mingming Zhu, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 86 days.

(21) Appl. No.: 15/708,760

(22) Filed: Sep. 19, 2017

(65) Prior Publication Data

US 2018/0091418 A1 Mar. 29, 2018

(30) Foreign Application Priority Data

Sep. 23, 2016 (CN) .......................... 2016 1 0845775

(51) Int. Cl.
*H04L 12/721* (2013.01)
*H04L 12/46* (2006.01)
(Continued)

(52) U.S. Cl.
CPC .......... *H04L 45/26* (2013.01); *H04L 12/4633* (2013.01); *H04L 45/22* (2013.01);
(Continued)

(58) Field of Classification Search
CPC ..... H04L 45/26; H04L 12/4633; H04L 45/22; H04L 45/64; H04L 45/02; H04L 43/12; H04L 45/38; H04L 12/4641
See application file for complete search history.

(56) References Cited

U.S. PATENT DOCUMENTS

| 8,339,973 B1* | 12/2012 | Pichumani | H04L 43/10 370/248 |
| 2008/0212484 A1* | 9/2008 | Kaminsky | H04L 41/12 370/248 |

(Continued)

FOREIGN PATENT DOCUMENTS

WO   2017067178 A1   4/2017

OTHER PUBLICATIONS

Machine Translation and Abstract of International Publication No. WO2017067178, dated Apr. 27, 2017, 52 pages.

(Continued)

*Primary Examiner* — Ian N Moore
*Assistant Examiner* — Justin T Van Roie
(74) *Attorney, Agent, or Firm* — Conley Rose, P.C.

(57) ABSTRACT

A method and a related apparatus for probing a packet forwarding path, so that a packet forwarding path between any two devices can be probed is presented. A controller determines a source device and a destination device, where there is at least one intermediate device between the source device and the destination device; the controller sends an Internet Protocol (IP) packet that includes a probe identifier to the source device; the controller receives a first message sent by the destination device and a second message sent by the intermediate device; the controller determines a forwarding path of the IP packet according to the IP packet and a first inbound interface identifier that are sent by the destination device, the IP packet and a second inbound interface identifier that are sent by the intermediate device, and a network topology.

20 Claims, 4 Drawing Sheets

(51) Int. Cl.
*H04L 12/707* (2013.01)
*H04L 12/26* (2006.01)
*H04L 12/751* (2013.01)
*H04L 12/715* (2013.01)

(52) U.S. Cl.
CPC .......... *H04L 12/4641* (2013.01); *H04L 43/12* (2013.01); *H04L 45/02* (2013.01); *H04L 45/38* (2013.01); *H04L 45/64* (2013.01)

(56) References Cited

U.S. PATENT DOCUMENTS

2015/0256397 A1 9/2015 Agarwal et al.
2015/0281036 A1 10/2015 Sun et al.

OTHER PUBLICATIONS

Foreign Communication From a Counterpart Application, European Application No. 17191953.3, Extended European Search Report dated Dec. 1, 2017, 9 pages.
Pang, J., et al., "Path Detection in VXLAN Overlay Network," XP015109358, draft-pang-nvo3-vxlan-path-detection-01.txt, Oct. 19, 2015, 16 pages.
Foreign Communication From a Counterpart Application, European Application No. 17191953.3, European Notice of Allowance dated Nov. 16, 2018, 37 pages.

\* cited by examiner

METHOD AND RELATED APPARATUS FOR PROBING PACKET FORWARDING PATH

CROSS-REFERENCE TO RELATED APPLICATION

This application claims priority to Chinese Patent Application No. 201610845775.8, filed on Sep. 23, 2016, which is hereby incorporated by reference in its entirety.

TECHNICAL FIELD

The present disclosure relates to the communications field, and in particular, to a method and a related apparatus for probing a packet forwarding path.

BACKGROUND

A Virtual Extensible LAN (VXLAN) is a network virtualization technology, and is used to resolve an extensibility problem caused by large-scale cloud computing deployment. The Virtual Extensible LAN is applied to a data center network, and enables a virtual machine (VM) to migrate within a range of three layers of networks that are connected to each other, without a need to change an Internet Protocol (IP) address or a Media Access Control (MAC) address of the VM, thereby ensuring service continuity. In the VXLAN, separation between a virtual network and a physical network is implemented by deploying an intelligent entity at an edge of the physical network, that is, a VXLAN tunnel end point (VTEP). A tunnel is established between VTEPs, and when a data frame of the virtual network is transmitted in the physical network over the tunnel, the physical network does not perceive the virtual network.

In an operation and maintenance process of the data center network, for purposes such as traffic monitoring and fault diagnosis, it is necessary to know a packet forwarding path between any two VTEPs in the data center network, a forwarding path of particular traffic (identified by at least one of a particular protocol type, a particular source port number, or a particular destination port number) between two particular VMs in the data center network, and a forwarding path of particular traffic between a VM and a server or a host in a conventional network.

In the prior art, the last bit of the last reserved byte of a VXLAN header of a VXLAN encapsulated packet is set to 1 to denote a probe identifier, so as to identify a probe packet. A controller sends, using a packet-out message, a VXLAN encapsulated probe packet to a source device. When sending the probe packet, the source device sets the last bit of a reserved byte in a VXLAN header to 1. When the probe packet is forwarded in the data center network, a network device that receives the probe packet sends the probe packet to the controller using a packet-in message, and the controller calculates, according to received multiple probe packets, an actual forwarding path of the probe packet sent by the controller.

In the foregoing solution, because the probe identifier of the probe packet is in the VXLAN header, only a forwarding path of the probe packet in the VXLAN network can be determined. If a destination device of the probe packet is a server outside the VXLAN network, the probe packet cannot carry the probe identifier after the VXALN header is removed on a VXLAN gateway. Therefore, in the foregoing solution, only a path from the source device to the gateway can be probed, and a complete path from the source device to the destination device cannot be probed. Even if the gateway can re-encapsulate the probe packet using a VXLAN header, the gateway does not add a probe identifier to the probe packet, and as a result, probing of the packet forwarding path between the source device and the destination device across subnets is interrupted on the gateway, and the complete path between the source device and the destination device cannot be probed.

SUMMARY

This application provides a method and a related apparatus for probing a packet forwarding path, so that a packet forwarding path between any two devices can be probed and network operation and maintenance efficiency can be improved.

A first aspect of this application provides a method for probing a packet forwarding path. In the method, a controller determines a source device and a destination device between which a packet forwarding path needs to be probed, there is at least one intermediate device between the source device and the destination device, and the intermediate device is used to forward a packet. The source device and the destination device belong to different network segments. For example, the source device belongs to a first network segment, and the destination device belongs to a second network segment. A network segment to which the intermediate device belongs is not limited herein.

After determining the source device and the destination device, the controller sends an IP packet that includes a probe identifier to the source device, and after receiving the IP packet, the source device needs to send the IP packet to the destination device. The probe identifier is located in an acknowledgment (ACK) number field of a transmission control protocol (TCP) header of the IP packet. In this way, the probe identifier can be retained even if the IP packet is forwarded to a network segment to which the source device does not belong. Therefore, the destination device and the intermediate device between the source device and the destination device can capture the IP packet according to the probe identifier. The destination device and the intermediate device respectively add, to corresponding messages, the captured IP packet and interface identifiers of interfaces used by the devices to receive the IP packet, and send the corresponding messages to the controller.

The controller receives a first message sent by the destination device and a second message sent by the intermediate device. The destination device adds, to the first message, the captured IP packet and an identifier of an interface used by the destination device to receive the IP packet, and the intermediate device adds, to the second message, the captured IP packet and an identifier of an interface used by the intermediate device to receive the IP packet. Therefore, the first message includes the IP packet that is captured by the destination device according to the probe identifier, and a first inbound interface identifier of the IP packet, and the first inbound interface identifier is used to indicate the interface used by the destination device to receive the IP packet. The second message includes the IP packet that is captured by the intermediate device according to the probe identifier, and a second inbound interface identifier of the IP packet, and the second inbound interface identifier is used to indicate the interface used by the intermediate device to receive the IP packet. The controller can determine a forwarding path of the IP packet according to the IP packet and the first inbound interface identifier that are sent by the destination device, the IP packet and the second inbound interface identifier that are sent by the intermediate device, and a network topology, so as to probe a packet forwarding path between the source device and the destination device. The source device and the destination device are any two devices that belong to different network segments. Therefore, in this method, a packet forwarding path between any two devices can be probed, so as to further probe a packet forwarding path between subnets and a cross-VXLAN network packet forwarding path, and improve network operation and maintenance efficiency.

With reference to the first aspect of this application, in a first implementation of the first aspect, before the controller sends the IP packet that includes the probe identifier to the source device, the controller further determines a source port number of the source device and a destination port number of the destination device after determining the source device and the destination device between which a packet forwarding path needs to be probed.

After determining the source port number and the destination port number, the controller further constructs the IP packet that includes the probe identifier, and the IP packet includes an IP address of the source device, an IP address of the destination device, the source port number, and the destination port number.

With reference to the first aspect of this application or the first implementation of the first aspect, in a second implementation of the first aspect, a valid payload part of the IP packet includes a check field, and the check field is used to enable the destination device or the intermediate device to filter a captured data packet, so as to determine the IP packet that includes the probe identifier. Because there is a probability that another data packet other than the IP packet is mistakenly captured, the check field is configured in the valid payload part of the IP packet, and the destination device or the intermediate device may further check the check field in the IP packet to filter out the another data packet mistakenly captured, and send the IP packet that includes the probe identifier to the controller.

With reference to the first aspect of this application or the first implementation of the first aspect, in a third implementation of the first aspect, the first network segment to which the source device belongs is a VXLAN, and the second network segment to which the destination device belongs is an external network connected to the VXLAN. Therefore, a cross-VXLAN network packet forwarding path can be probed by probing the packet forwarding path between the source device and the destination device.

With reference to the first aspect of this application or the first implementation of the first aspect, in a fourth implementation of the first aspect, the first network segment to which the source device belongs is a first subnet in a VXLAN, and the second network segment to which the destination device belongs is a second subnet in the VXLAN. Therefore, a packet forwarding path between subnets in the VXLAN network can be probed by probing the packet forwarding path between the source device and the destination device.

A second aspect of this application provides an apparatus for probing a packet forwarding path, and the apparatus includes a memory and a processor, the memory stores program instructions, the processor executes the program instructions to determine a source device and a destination device, where there is at least one intermediate device between the source device and the destination device, the source device belongs to a first network segment, and the destination device belongs to a second network segment; and send an IP packet that includes a probe identifier to the source device, so that the source device sends the IP packet to the destination device, where the probe identifier is located in an acknowledgment (ACK) number field of a TCP header of the IP packet; receive a first message sent by the destination device and a second message sent by the intermediate device, where the first message includes the IP packet that is captured by the destination device according to the probe identifier, and a first inbound interface identifier of the IP packet, the first inbound interface identifier is used to indicate an interface used by the destination device to receive the IP packet, the second message includes the IP packet that is captured by the intermediate device according to the probe identifier, and a second inbound interface identifier of the IP packet, and the second inbound interface identifier is used to indicate an interface used by the intermediate device to receive the IP packet; and determine a forwarding path of the IP packet according to the IP packet and the first inbound interface identifier that are sent by the destination device, the IP packet and the second inbound interface identifier that are sent by the intermediate device, and a network topology.

In the apparatus, because the probe identifier is located in the acknowledgment (ACK) number field of the TCP header of the IP packet, the probe identifier can be retained even if the IP packet is forwarded to a network segment to which the source device does not belong. Therefore, the destination device and the intermediate device between the source device and the destination device can capture the IP packet according to the probe identifier. The destination device and the intermediate device respectively add, to corresponding messages, the captured IP packet and interface information corresponding to the devices, and send the corresponding messages to the transceiver unit. The transceiver unit receives the messages respectively sent by the destination device and the intermediate device, and the processing unit can determine a forwarding path of the IP packet according to the IP packet and a corresponding inbound interface identifier that are carried in each message, and a network topology, so as to probe a packet forwarding path between any two devices, further probe a packet forwarding path between subnets and a cross-VXLAN network packet forwarding path, and improve network operation and maintenance efficiency.

With reference to the second aspect of this application, in a first implementation of the second aspect, the processor is further configured to execute the program instructions to determine a source port number of the source device and a destination port number of the destination device; and generate the IP packet, where the IP packet further includes an IP address of the source device, an IP address of the destination device, the source port number, and the destination port number.

With reference to the second aspect of this application or the first implementation of the second aspect, in a second implementation of the second aspect, a valid payload part of the IP packet includes a check field, and the check field is used to enable the destination device or the intermediate device to filter a captured data packet, so as to determine the IP packet that includes the probe identifier. The check field is configured in the valid payload part of the IP packet, and the destination device or the intermediate device may further check the check field in the IP packet to filter out another data packet mistakenly captured, and send the IP packet that includes the probe identifier to the apparatus.

With reference to the second aspect of this application or the first implementation of the second aspect, in a third implementation of the second aspect, the first network segment to which the source device belongs is a VXLAN, and the second network segment to which the destination device belongs is an external network connected to the VXLAN. Therefore, a cross-VXLAN network packet forwarding path can be probed by probing the packet forwarding path between the source device and the destination device.

With reference to the second aspect of this application or the first implementation of the second aspect, in a fourth implementation of the second aspect, the first network segment to which the source device belongs is a first subnet in a VXLAN, and the second network segment to which the destination device belongs is a second subnet in the VXLAN. Therefore, a packet forwarding path between subnets in the VXLAN network can be probed by probing the packet forwarding path between the source device and the destination device.

A third aspect of this application provides a controller, and the controller includes a processor, a transceiver, and a memory. The memory is configured to store an instruction, and the processor is configured to execute the instruction, so as to execute the method for probing a packet forwarding path according to the first aspect of this application or any one of the implementations of the first aspect.

A fourth aspect of this application provides a storage medium, and the storage medium stores program code. When the program code is run by a controller, the method for probing a packet forwarding path according to the first aspect or any one of the implementations of the first aspect is executed. The storage medium includes but is not limited to a flash memory, a hard disk drive (HDD), or a solid state drive (SSD).

A fifth aspect of this application provides a system for probing a packet forwarding path. The system includes a controller, a source device, a destination device and at least one intermediate device between the source device and the destination device, where the source device belongs to a first network segment, and the destination device belongs to a second network segment.

In the system, the controller sends an IP packet that comprises a probe identifier to the source device, where the probe identifier is located in an acknowledgment (ACK) number field of a TCP header of the IP packet; the controller receives a first message sent by the destination device and a second message sent by the intermediate device, where the first message comprises the IP packet that is captured by the destination device according to the probe identifier, and a first inbound interface identifier of the IP packet, the first inbound interface identifier is used to indicate an interface used by the destination device to receive the IP packet, the second message comprises the IP packet that is captured by the intermediate device according to the probe identifier, and a second inbound interface identifier of the IP packet, and the second inbound interface identifier is used to indicate an interface used by the intermediate device to receive the IP packet; and the controller determines a forwarding path of the IP packet according to the IP packet and the first inbound interface identifier that are sent by the destination device, the IP packet and the second inbound interface identifier that are sent by the intermediate device, and a network topology; the source device receives the IP packet and send the IP packet to the destination device.

DESCRIPTION OF EMBODIMENTS

To make persons skilled in the art understand the technical solutions in this application better, the following describes the technical solutions in the embodiments of this application with reference to the accompanying drawings in this application.

Figure 1:
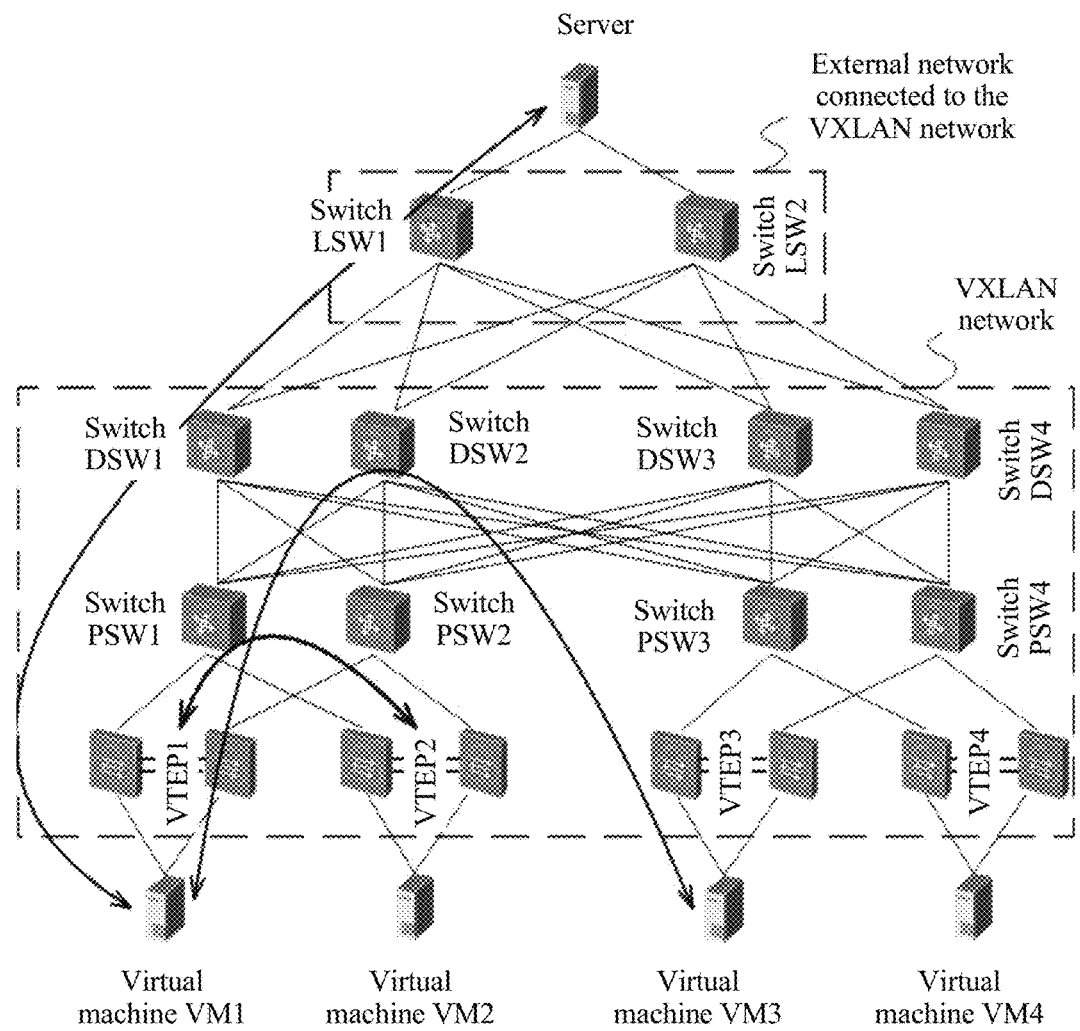
FIG. 1 is a schematic diagram of an architecture of a data center network according to this application.

In the specification, claims, and accompanying drawings of this application, the terms "first", "second", and so on (if they exist) are intended to distinguish between similar objects but do not necessarily indicate a specific order or sequence. It should be understood that the numbers in such a way are interchangeable in proper circumstances, so that the embodiments described in this application can be implemented in other orders than the order illustrated or described in the following accompanying drawings. Moreover, the terms "include", "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device. The embodiments of the present disclosure are applied to a data center network. As shown in FIG. 1, a VXLAN technology is deployed in the data center network, the data center network includes multiple VMs (a VM1 to a VM4 are shown in the figure) running on a server (not shown in the figure), and the multiple virtual machines access a VXLAN network respectively using corresponding VTEPs. For example, the VM1 accesses the VXLAN network using a VTEP1. Using the VTEP1 as an example, to improve network reliability, two VTEP devices are configured on the VTEP1 in FIG. 1, IP addresses of the two VTEP devices are the same, and one port is presented to the outside using a port aggregation technology. Therefore, a packet sent by the VM1 may be forwarded by either of the two VTEP devices. The VXLAN network includes a VTEP, a layer-3 forwarding and aggregation device, and a VXLAN gateway that are defined in VXLAN technical standards. The VTEP is used to implement separation between a physical network and a virtual network, and complete encapsulation and decapsulation of a VXLAN packet. For multiple VMs that access the VXLAN network, the VXLAN gateway is configured to implement packet forwarding between the multiple VMs. The VTEP, the layer-3 forwarding and aggregation device, and the VXLAN gateway may be virtual switches deployed on the server, or may be physical switches. Switches DSW1 to DSW4 in FIG. 1 are VXLAN gateways or VTEPs, and switches PSW1 to PSW4 are layer-3 forwarding and aggregation devices. In addition, the data center network further includes another device that communicates with the VXLAN network, for example, a switch LSW1, a switch LSW2, and the server in FIG. 1.

Figure 2:
FIG. 2 is a schematic structural diagram of a communications system according to this application.

This application provides a communications system. As shown in FIG. 2, the communications system includes a controller 200 and a data center network 100. For a structure of the data center network 100, refer to FIG. 1. The controller 200 can communicate with any device in the data center network 100.

Figure 3:
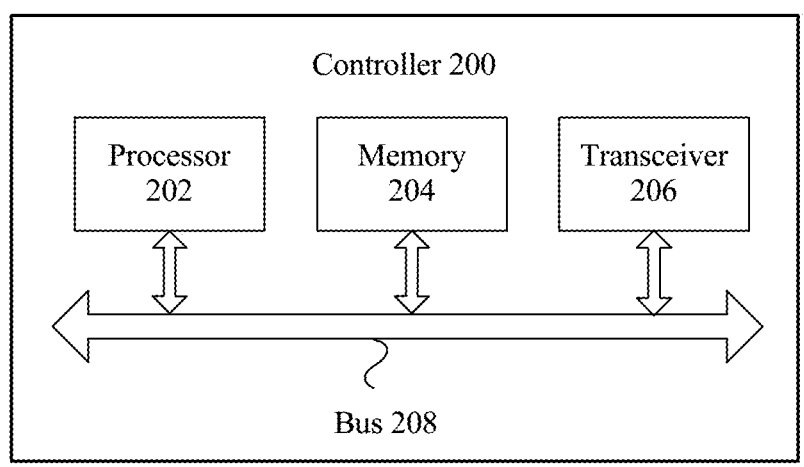
FIG. 3 is a schematic structural diagram of a controller according to this application.

The controller 200 shown in FIG. 2 can probe a forwarding path of particular traffic between any IP addresses and all forwarding paths between particular VTEPs, for example, can probe all forwarding paths from a VTEP1 to a VTEP2 in FIG. 1, a forwarding path of particular traffic between a VM1 and a VM3, or a forwarding path of particular traffic between a VM and a server in a conventional network. A schematic structural diagram of the controller 200 is shown in FIG. 3, and the controller 200 includes a processor 202, a memory 204, and a transceiver 206, and may further include a bus 208.

Communicative connections between the processor 202, the memory 204, and the transceiver 206 may be implemented using the bus 208, or communication may be implemented using other means such as wireless transmission.

The memory 204 may include a volatile memory, for example, a random access memory (RAM); the memory 204 may include a nonvolatile memory, for example, a read-only memory (ROM), a flash memory, a HDD, or a SSD; or the memory 204 may further include a combination of memories of the foregoing types. When technical solutions provided in this application are implemented using software, program code that is used to implement a method for probing a packet forwarding path provided in FIG. 4 in this application and that is executed by the controller 200 is stored in the memory 204, and is executed by the processor 202.

The controller 200 communicates with a network device using the transceiver 206.

The processor 202 may be a central processing unit (CPU).

The processor 202 is configured to determine a source device and a destination device. There is at least one intermediate device between the source device and the destination device, the source device belongs to a first network segment, and the destination device belongs to a second network segment.

The transceiver 206 is configured to send an IP packet that includes a probe identifier to the source device, so that the source device sends the IP packet to the destination device. The probe identifier is located in an acknowledgment (ACK) number field of a TCP header of the IP packet.

The transceiver 206 is further configured to receive a first message sent by the destination device and a second message sent by the intermediate device. The first message includes the IP packet that is captured by the destination device according to the probe identifier, and a first inbound interface identifier of the IP packet, the first inbound interface identifier is used to indicate an interface used by the destination device to receive the IP packet, the second message includes the IP packet that is captured by the intermediate device according to the probe identifier, and a second inbound interface identifier of the IP packet, and the second inbound interface identifier is used to indicate an interface used by the intermediate device to receive the IP packet.

The processor 202 is further configured to determine a forwarding path of the IP packet according to the IP packet and the first inbound interface identifier that are sent by the destination device, the IP packet and the second inbound interface identifier that are sent by the intermediate device, and a network topology.

In this embodiment of this application, the processor 202 determines a source device and a destination device, and the transceiver 206 sends an IP packet that includes a probe identifier to the source device. Because the probe identifier is located in an acknowledgment (ACK) number field of the TCP header of the IP packet, the probe identifier can be retained even if the IP packet is forwarded to a network segment to which the source device does not belong. Therefore, the destination device and an intermediate device between the source device and the destination device can capture the IP packet according to the probe identifier. The destination device and the intermediate device respectively add, to corresponding messages, the captured IP packet and interface information corresponding to the devices, and send the corresponding messages to the transceiver 206. The transceiver 206 receives the messages respectively sent by the destination device and the intermediate device, and the processor 202 can determine a forwarding path of the IP packet according to the IP packet and a corresponding inbound interface identifier that are carried in each message, and a network topology, so as to probe a packet forwarding path between any two IP addresses, further probe a packet forwarding path between subnets and a cross-VXLAN network packet forwarding path, and improve network operation and maintenance efficiency.

Optionally, the processor 202 is further configured to determine a source port number of the source device and a destination port number of the destination device; and generate the IP packet, where the IP packet further includes an IP address of the source device, an IP address of the destination device, the source port number, and the destination port number.

Optionally, a valid payload part of the IP packet includes a check field, and the check field is used to enable the destination device or the intermediate device to filter a captured data packet, so as to determine the IP packet that includes the probe identifier.

Optionally, the first network segment is a VXLAN, and the second network segment is an external network connected to the VXLAN.

Optionally, the first network segment is a first subnet in a VXLAN, and the second network segment is a second subnet in the VXLAN.

Figure 4:
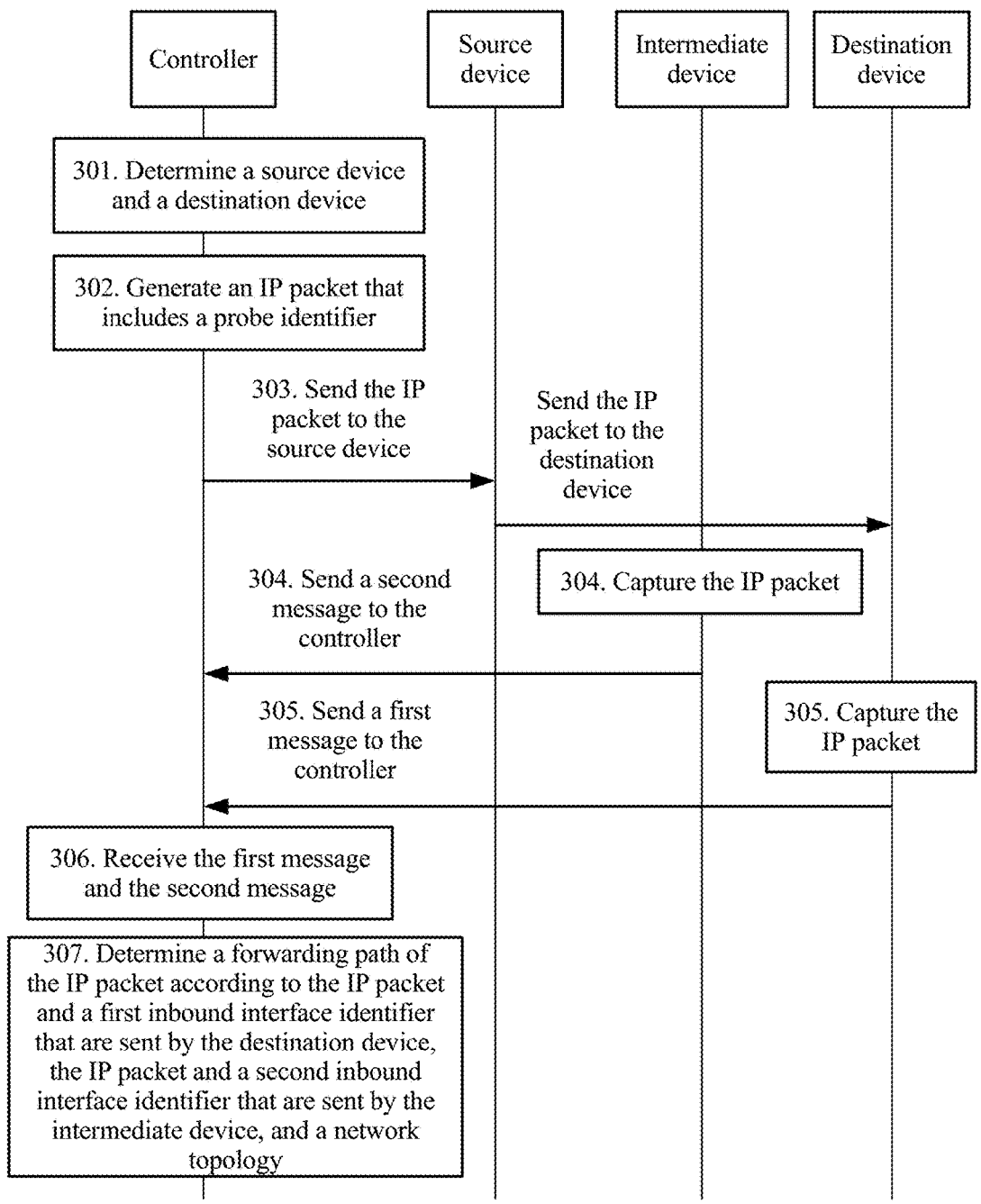
FIG. 4 is a schematic flowchart of a method for probing a packet forwarding path according to this application.

This application further provides a method for probing a packet forwarding path. The controller 200 in FIG. 2 or FIG. 3 executes this method when operating. A schematic flowchart of the method is shown in FIG. 4 to perform the following steps.

Step 301. The controller determines a source device and a destination device. There is at least one intermediate device between the source device and the destination device, the source device belongs to a first network segment, and the destination device belongs to a second network segment.

It should be noted that, the controller first needs to determine the source device and the destination device, so as to subsequently probe an IP packet forwarding path. The source device and the destination device belong to different network segments, there is at least one intermediate device between the source device and the destination device, and the intermediate device can finally forward, to the destination device, an IP packet sent by the source device. In this embodiment, the intermediate device is not limited in quantity, and if there are multiple intermediate devices, IP packet forwarding may be performed between neighboring intermediate devices, and the IP packet is finally forwarded to the destination device.

The source device and the destination device may belong to different networks. Optionally, the first network segment may be a VXLAN, and the second network segment may be an external network connected to the VXLAN.

The source device and the destination device may belong to different subnets in a same network. Optionally, the first network segment may be a first subnet in a VXLAN, and the second network segment may be a second subnet in the VXLAN.

Step 302. The controller generates an IP packet that includes a probe identifier. The probe identifier is located in an acknowledgment (ACK) number field of a TCP header of the IP packet.

Optionally, the method further includes the controller determines a source port number of the source device and a destination port number of the destination device; and the controller generates the IP packet, where the IP packet further includes an IP address of the source device, an IP address of the destination device, the source port number, and the destination port number.

The source port number and the destination port number may be designated by network maintenance personnel, or may be determined by the controller according to a specific rule.

It should be noted that, when constructing the IP packet that includes the probe identifier, the controller puts a 4-byte probe identifier into the ACK number field of the TCP header of the IP packet, and writes the corresponding source port number, the corresponding destination port number, the corresponding source IP address, and the corresponding destination IP address into the IP packet according to port information of the source device and the destination device.

Optionally, a valid payload part of the IP packet includes a check field, and the check field is used to enable the destination device or the intermediate device to filter a captured data packet, so as to determine the IP packet that includes the probe identifier.

For example, other fields for path probing are added to the valid payload of the IP packet, and specifically include 82 all-0 reserved bytes, a 4-byte all-F probe identifier, a 1-byte probing type, a 3-byte reserved field, a probe identifier type-length value (TLV), and a VPN name TLV. The IP packet is sent to the source device (that is, a network device from which probing starts) using a packet-out message, and a specific payload format is shown in the following Table 1:

TABLE 1

Payload packet
Payload Reserved
P_OAM_FLAG
OamType
P_OAM_RSV
P_TESTID_TYPE
P_TESTID_LEN
testID
P_VPN_NAME_TYPE
VPN_LEN
VPN Name The payload packet part in Table 1 includes 102 bytes and a VPN name length, and specifically includes 82 reserved bytes (Payload Reserved in Table 1) with a fixed value 0, a 4-byte probe identifier (P_OAM_FLAG in Table 1) with a fixed value 0xFFFFFFFF, a 1-byte probing type (OamType in Table 1), three reserved field P_OAM_RSV, a 2-byte probe identifier type (P_TESTID_TYPE in Table 1) with a fixed value 0xF001, a 2-byte probe identifier length (P_TESTID_LEN in Table 1) with a fixed value 4, a 4-byte probe identifier (testID in Table 1), a 2-byte VPN name type (P_VPN_NAME_TYPE in Table 1) with a fixed value 0xF002, a 2-byte VPN name len (VPN_LEN in Table 1), and a VPN name (VPN Name in Table 1).

Step 303. The controller sends the IP packet to the source device, so that the source device sends the IP packet to the destination device.

It should be noted that the controller sends the generated IP packet to the source device (that is, the network device from which probing starts) using a packet-out message. After receiving the IP packet, the source device sends the IP packet.

Step 304. When the IP packet is sent to the intermediate device, the intermediate device captures the IP packet according to the probe identifier, and sends a second message to the controller.

The intermediate device captures the IP packet according to the probe identifier, for example, specifically captures, using a hardware access control list (ACL) rule, a packet whose TCP header has an acknowledgment field with content 0x4f414d21. Because there is a probability that another data packet other than the IP packet is mistakenly captured, the intermediate device further needs to check information (which is specifically the probe identifier and two TLVs in the payload) in the payload of the IP packet, so as to filter out the another data packet mistakenly captured, and sends, using the second message (for example, a packet-in message), the IP packet that includes the probe identifier to the controller.

The second message includes the IP packet and a second inbound interface identifier of the IP packet, and the second inbound interface identifier is used to indicate an interface used by the intermediate device to receive the IP packet. The second message is of a message type (for example, packet-in message) specified in the OpenFlow standard protocol, and the controller designates, using the second message, a forwarder for transmitting a packet.

Step 305. When the IP packet is sent to the destination device, the destination device captures the IP packet according to the probe identifier, and sends a first message to the controller.

With reference to an understanding of step 304, in this step, the destination device captures the IP packet according to the probe identifier, and further needs to check information in the payload of the IP packet. Details are not described herein.

The first message includes the IP packet and a first inbound interface identifier of the IP packet, and the first inbound interface identifier is used to indicate an interface used by the destination device to receive the IP packet. Both the first message and the second message are of the message type (for example, packet-in message) specified in the OpenFlow standard protocol.

Step 306. The controller receives the first message sent by the destination device and the second message sent by the intermediate device.

It should be noted that, the controller receives a packet-in message sent by each network device that participates in forwarding the IP packet in the network, and in this step, network devices that participate in forwarding the IP packet are correspondingly the destination device and the intermediate device. Therefore, packet-in messages received by the controller include the first message sent by the destination device and the second message sent by the intermediate device.

Step 307. The controller determines a forwarding path of the IP packet according to the IP packet and the first inbound interface identifier that are sent by the destination device, the IP packet and the second inbound interface identifier that are sent by the intermediate device, and a network topology.

It should be noted that the first message and the second message include some parameters used by the controller to determine the forwarding path of the IP packet. For example, the first message includes the IP packet and the first inbound interface identifier of the IP packet. The controller determines the forwarding path of the IP packet according to packet-in messages sent by devices that participate in forwarding the IP packet and a connection relationship between the devices. In this embodiment, the controller obtains, according to time to live (TTL) values of the IP packet in the first message and the second message, a sequence of passing through network devices by the IP packet, and may determine the entire forwarding path of the IP packet according to an inbound interface identifier (carried in a packet-in message sent by each device that participates in forwarding the IP packet) of the IP packet when entering the network device and the network topology. It should be noted that the controller may obtain the network topology in advance, and the network topology includes a connection relationship between all devices in a data center network.

In this embodiment of this application, a controller determines a source device and a destination device, and the controller sends an IP packet that includes a probe identifier to the source device. Because the probe identifier is located in an acknowledgment (ACK) number field of the TCP header of the IP packet, the probe identifier can be retained even if the IP packet is forwarded to a network segment to which the source device does not belong. Therefore, the destination device and an intermediate device between the source device and the destination device can capture the IP packet according to the probe identifier. The destination device and the intermediate device respectively add, to corresponding messages, the captured IP packet and interface information corresponding to the devices, and send the corresponding messages to the controller. The controller receives the messages respectively sent by the destination device and the intermediate device, and can determine a forwarding path of the IP packet according to the IP packet and a corresponding inbound interface identifier that are carried in each message, and a network topology, so as to probe a packet forwarding path between any two IP addresses, further probe a packet forwarding path between subnets and a cross-VXLAN network packet forwarding path, and improve network operation and maintenance efficiency.

The following uses a specific application scenario to describe the method provided in this application. The data center network shown in FIG. 1 is used as an example. For example, a forwarding path of particular traffic from a VM1 to a VM3, that is, an IP packet whose layer-4 source port number is SPORT and destination port number is DPORT, needs to be probed. The controller constructs an IP packet in which a source IP address is an IP address of the VM1, a destination IP address is an IP address of the VM3, a source port number is SPORT, and a destination port number is DPORT. The controller puts a probe identifier into an ACK number field of a TCP header of the IP packet, and sends, using a packet-out message, the IP packet that includes the probe identifier to a source device VTEP1. The VTEP1 device sends the IP packet. When passing through devices PSW2, DSW2, PSW3, and VTEP3, the IP packet is separately captured by the devices. The devices send the IP packet and an inbound interface identifier of the IP packet to the controller using a packet-in message. The controller may calculate, according to TTL of the IP packet, inbound interfaces of the devices, and a connection relationship between the devices, a path that is passed through by the particular traffic, and present the path.

For another example, if all forwarding paths between the VTEP1 and a VTEP2 need to be probed, the controller constructs a large quantity of IP packets that include a probe identifier and in which a source IP address is the VTEP1, a destination IP address is the VTEP2, and a source port number and a destination port number hop. The controller sends, using packet-out messages, the IP packets that include the probe identifier to the VTEP1. The VTEP1 sends these IP packets. When passing through different forwarding paths, these IP packets are captured by network devices on the paths, and are sent to the controller. The controller calculates, according to characteristics of these IP packets such as the source port number, the destination port number, TTL, and inbound interface identifiers, and a connection relationship between the devices, all paths that are passed through by these IP packets, and presents all the paths.

An embodiment of this application further provides an apparatus 400 for probing a packet forwarding path. The apparatus 400 for probing a packet forwarding path may be implemented using the controller 200 shown in FIG. 2 or FIG. 3, or may be implemented using an application-specific integrated circuit (ASIC), or may be implemented using a programmable logic device (PLD). The PLD may be a complex programmable logic device (CPLD), an field programmable gate array (FPGA), generic array logic (GAL), or any combination thereof. The apparatus 400 for probing a packet forwarding path is configured to implement the method executed by the controller in the method for probing a packet forwarding path shown in FIG. 4. When the method for probing a packet forwarding path shown in FIG. 4 is implemented using software, the apparatus 400 for probing a packet forwarding path may be a software module.

Figure 5:
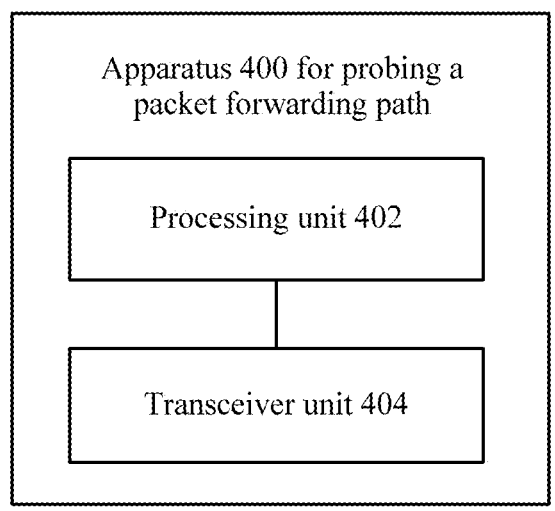
FIG. 5 is a schematic structural diagram of an apparatus for probing a packet forwarding path according to this application.

A schematic structural diagram of the apparatus 400 for probing a packet forwarding path is shown in FIG. 5, and the apparatus 400 includes a processing unit 402 and a transceiver unit 404.

The processing unit 402 is configured to determine a source device and a destination device. There is at least one intermediate device between the source device and the destination device, the source device belongs to a first network segment, and the destination device belongs to a second network segment.

The transceiver unit 404 is configured to send an IP packet that includes a probe identifier to the source device, so that the source device sends the IP packet to the destination device. The probe identifier is located in an acknowledgment (ACK) number field of a TCP header of the IP packet.

The transceiver unit 404 is further configured to receive a first message sent by the destination device and a second message sent by the intermediate device. The first message includes the IP packet that is captured by the destination device according to the probe identifier, and a first inbound interface identifier of the IP packet, the first inbound interface identifier is used to indicate an interface used by the destination device to receive the IP packet, the second message includes the IP packet that is captured by the intermediate device according to the probe identifier, and a second inbound interface identifier of the IP packet, and the second inbound interface identifier is used to indicate an interface used by the intermediate device to receive the IP packet.

The processing unit 402 is further configured to determine a forwarding path of the IP packet according to the IP packet and the first inbound interface identifier that are sent by the destination device, the IP packet and the second inbound interface identifier that are sent by the intermediate device, and a network topology.

In this embodiment of this application, the processing unit 402 determines a source device and a destination device, and the transceiver unit 404 sends an IP packet that includes a probe identifier to the source device. Because the probe identifier is located in an acknowledgment (ACK) number field of the TCP header of the IP packet, the probe identifier can be retained even if the IP packet is forwarded to a network segment to which the source device does not belong. Therefore, the destination device and an intermediate device between the source device and the destination device can capture the IP packet according to the probe identifier. The destination device and the intermediate device respectively add, to corresponding messages, the captured IP packet and interface information corresponding to the devices, and send the corresponding messages to the transceiver unit 404. The transceiver unit 404 receives the messages respectively sent by the destination device and the intermediate device, and the processing unit 402 can determine a forwarding path of the IP packet according to the IP packet and a corresponding inbound interface identifier that are carried in each message, and a network topology, so as to probe a packet forwarding path between any two IP addresses, further probe a packet forwarding path between subnets and a cross-VXLAN network packet forwarding path, and improve network operation and maintenance efficiency.

Optionally, the processing unit 402 is further configured to determine a source port number and a destination port number; and generate the IP packet, where the IP packet further includes an IP address of the source device, an IP address of the destination device, the source port number, and the destination port number.

Optionally, a valid payload part of the IP packet includes a check field, and the check field is used to enable the destination device or the intermediate device to filter a captured data packet, so as to determine the IP packet that includes the probe identifier.

Optionally, the first network segment is a VXLAN, and the second network segment is an external network connected to the VXLAN.

Optionally, the first network segment is a first subnet in a VXLAN, and the second network segment is a second subnet in the VXLAN. For related descriptions of the foregoing apparatus, refer to the related descriptions and the effects of the method embodiment parts for understanding. Details are not described herein.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of this application.

What is claimed is:

1. A method for probing a packet forwarding path, comprising:

determining, by a controller, a source device and a destination device, wherein there is at least one intermediate device between the source device and the destination device, wherein the source device belongs to a first network segment, and wherein the destination device belongs to a second network segment;

sending, by the controller, an Internet Protocol (IP) packet comprising a probe identifier to the source device, wherein the probe identifier is located in an acknowledgment (ACK) number field of a transmission control protocol (TCP) header of the IP packet;

receiving, by the controller, a first message sent by the destination device and a second message sent by the intermediate device, wherein the first message comprises the IP packet captured by the destination device according to the probe identifier and a first inbound interface identifier of the IP packet, wherein the first inbound interface identifier is used to indicate an interface used by the destination device to receive the IP packet, wherein the second message comprises the IP packet captured by the intermediate device according to the probe identifier and a second inbound interface identifier of the IP packet, and wherein the second inbound interface identifier is used to indicate an interface used by the intermediate device to receive the IP packet; and determining, by the controller, a forwarding path of the IP packet according to the IP packet and the first inbound interface identifier that are sent by the destination device, the IP packet and the second inbound interface identifier that are sent by the intermediate device, and a network topology.

2. The method according to claim 1, wherein before sending, by the controller, the IP packet comprising the probe identifier to the source device, the method further comprises:

determining, by the controller, a source port number of the source device and a destination port number of the destination device; and generating, by the controller, the IP packet, wherein the IP packet further comprises an IP address of the source device, an IP address of the destination device, the source port number, and the destination port number.

3. The method according to claim 2, wherein a valid payload part of the IP packet comprises a check field, and wherein the check field is used to enable the destination device or the intermediate device to filter a captured data packet, so as to determine the IP packet that comprises the probe identifier.

4. The method according to claim 2, wherein the first network segment is a Virtual Extensible Local Area Network (VXLAN), and wherein the second network segment is an external network connected to the VXLAN.

5. The method according to claim 2, wherein the first network segment is a first subnet in a Virtual Extensible Local Area Network (VXLAN), and wherein the second network segment is a second subnet in the VXLAN.

6. The method according to claim 1, wherein a valid payload part of the IP packet comprises a check field, and wherein the check field is used to enable the destination device or the intermediate device to filter a captured data packet, so as to determine the IP packet that comprises the probe identifier.

7. The method according to claim 1, wherein the first network segment is a Virtual Extensible Local Area Network (VXLAN), and wherein the second network segment is an external network connected to the VXLAN.

8. The method according to claim 1, wherein the first network segment is a first subnet in a Virtual Extensible Local Area Network (VXLAN), and wherein the second network segment is a second subnet in the VXLAN.

9. An apparatus for probing a packet forwarding path, comprising:
a memory configured to store program instructions;
a processor coupled to the memory and configured to execute the program instructions to:
determine a source device and a destination device, wherein there is at least one intermediate device between the source device and the destination device, wherein the source device belongs to a first network segment, and wherein the destination device belongs to a second network segment; and
send an Internet Protocol (IP) packet comprising a probe identifier to the source device, wherein the probe identifier is located in an acknowledgment (ACK) number field of a transmission control protocol (TCP) header of the IP packet;
receive a first message sent by the destination device and a second message sent by the intermediate device, wherein the first message comprises the IP packet captured by the destination device according to the probe identifier and a first inbound interface identifier of the IP packet, wherein the first inbound interface identifier is used to indicate an interface used by the destination device to receive the IP packet, wherein the second message comprises the IP packet captured by the intermediate device according to the probe identifier and a second inbound interface identifier of the IP packet, and wherein the second inbound interface identifier is used to indicate an interface used by the intermediate device to receive the IP packet; and
determine a forwarding path of the IP packet according to the IP packet and the first inbound interface identifier that are sent by the destination device, the IP packet and the second inbound interface identifier that are sent by the intermediate device, and a network topology.

10. The apparatus according to claim 9, wherein the processor is further configured to execute the program instructions to:
determine a source port number of the source device and a destination port number of the destination device; and
generate the IP packet, wherein the IP packet further comprises an IP address of the source device, an IP address of the destination device, the source port number, and the destination port number.

11. The apparatus according to claim 10, wherein a valid payload part of the IP packet comprises a check field, and wherein the check field is used to enable the destination device or the intermediate device to filter a captured data packet, so as to determine the IP packet that comprises the probe identifier.

12. The apparatus according to claim 10, wherein the first network segment is a Virtual Extensible Local Area Network (VXLAN) and wherein the second network segment is an external network connected to the VXLAN.

13. The apparatus according to claim 10, wherein the first network segment is a first subnet in a Virtual Extensible Local Area Network (VXLAN) and wherein the second network segment is a second subnet in the VXLAN.

14. The apparatus according to claim 9, wherein a valid payload part of the IP packet comprises a check field, and wherein the check field is used to enable the destination device or the intermediate device to filter a captured data packet, so as to determine the IP packet that comprises the probe identifier.

15. The apparatus according to claim 9, wherein the first network segment is a Virtual Extensible Local Area Network (VXLAN) and wherein the second network segment is an external network connected to the VXLAN.

16. The apparatus according to claim 9, wherein the first network segment is a first subnet in a Virtual Extensible Local Area Network (VXLAN) and wherein the second network segment is a second subnet in the VXLAN.

17. A system for probing a packet forwarding path, comprising:
a source device belonging to a first network segment;
a destination device belonging to a second network segment;
at least one intermediate device between the source device and the destination device; and
a controller in communication with the source device and the destination device, wherein the controller is configured to:
send an Internet Protocol (IP) packet comprising a probe identifier to the source device, wherein the probe identifier is located in an acknowledgment (ACK) number field of a transmission control protocol (TCP) header of the IP packet;
receive a first message sent by the destination device and a second message sent by the intermediate device, wherein the first message comprises the IP packet captured by the destination device according to the probe identifier and a first inbound interface identifier of the IP packet, wherein the first inbound interface identifier is used to indicate an interface used by the destination device to receive the IP packet, wherein the second message comprises the IP packet captured by the intermediate device according to the probe identifier and a second inbound interface identifier of the IP packet, and wherein the second inbound interface identifier is used to indicate an interface used by the intermediate device to receive the IP packet; and determine a forwarding path of the IP packet according to the IP packet and the first inbound interface identifier that are sent by the destination device, the IP packet and the second inbound interface identifier that are sent by the intermediate device, and a network topology, wherein the source device is configured to receive the IP packet and send the IP packet to the destination device.

18. The system according to claim 17, wherein the controller is further configured to:

determine a source port number of the source device and a destination port number of the destination device; and generate the IP packet, wherein the IP packet further comprises an IP address of the source device, an IP address of the destination device, the source port number, and the destination port number.

19. The system according to claim 18, wherein a valid payload part of the IP packet comprises a check field, and wherein the check field is used to enable the destination device or the intermediate device to filter a captured data packet, so as to determine the IP packet that comprises the probe identifier.

20. The system according to claim 17, wherein a valid payload part of the IP packet comprises a check field, and wherein the check field is used to enable the destination device or the intermediate device to filter a captured data packet, so as to determine the IP packet that comprises the probe identifier.

* * * * *